United States Patent [19]
Lin et al.

[11] Patent Number: 5,932,365
[45] Date of Patent: Aug. 3, 1999

[54] HYDROGEN CANISTER FUEL CELL BATTERY

[75] Inventors: Chien-Liang Lin; Yaw-Chung Cheng; Andrew S. Lin, all of Hsinchu, Taiwan

[73] Assignee: Industrial Technology REsearch Institute, Hsinchu, Taiwan

[21] Appl. No.: 08/871,436

[22] Filed: Jun. 9, 1997

[51] Int. Cl.$^6$ .................................................. H01M 8/04
[52] U.S. Cl. ................... 429/12; 429/19; 429/34; 429/38
[58] Field of Search ...................... 429/12, 19, 34, 429/38, 39

[56] References Cited

U.S. PATENT DOCUMENTS

| | | | |
|---|---|---|---|
| 4,175,165 | 11/1979 | Adlhart | 429/30 |
| 4,615,107 | 10/1986 | Kumeta et al. | 29/623.1 |
| 4,826,741 | 5/1989 | Adlhart et al. | 429/19 |
| 5,560,999 | 10/1996 | Pedicini et al. | 429/27 |

*Primary Examiner*—Maria Nuzzolillo
*Assistant Examiner*—Angela J. Martin
*Attorney, Agent, or Firm*—Smith, Gambrell & Russell, LLP; Beveridge, DeGrandi, Weilacher & Young Intellectual Property Group

[57] ABSTRACT

A hydrogen canister fuel cell battery including a base having at least one hydrogen distribution channel communicating with a hydrogen canister for passage of hydrogen to a fuel cell on the base. An air supply is disposed in front of the fuel cell for sending air into the fuel cell, so that oxygen and hydrogen may react electrochemically in the fuel cell to generate electricity. The present invention also provides an arrangement that utilizes fuel cells to have a larger area of contact with the ambient air so as to eliminate use of fans and starting power devices and thus achieve a compact hydrogen canister fuel cell battery for use in products such as notebook computers and cellular phones.

31 Claims, 11 Drawing Sheets

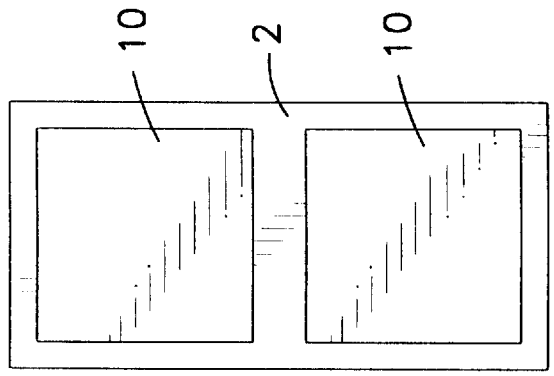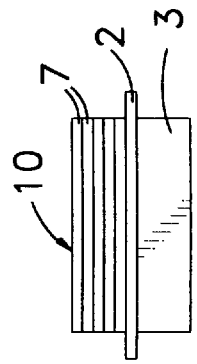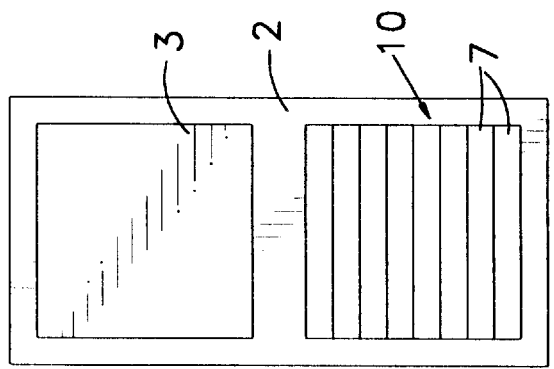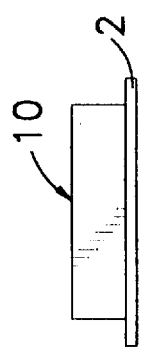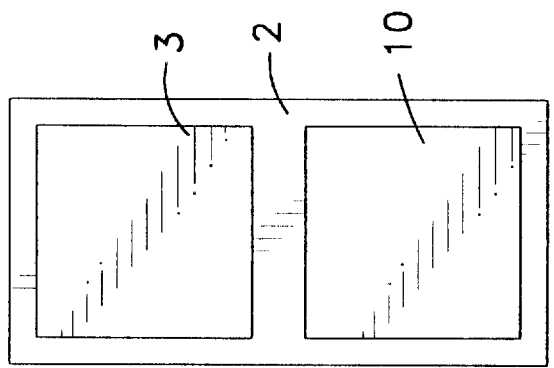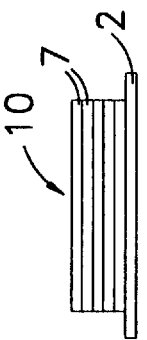

HYDROGEN CANISTER FUEL CELL BATTERY

BACKGROUND OF THE INVENTION

1. Field of the Invention

The present invention relates generally to a fuel cell, and more particularly to a hydrogen canister fuel cell that can be minimized for use in notebook computers or cellular phones.

2. Description of the Prior Art

Batteries commonly used in portable notebook computers, mobile phones, cameras, etc. generally fall into two main types, namely, primary batteries and secondary batteries. Primary batteries may pollute the environment if they are not disposed of properly. The problem with secondary batteries is their power capacity and the charging times and cycle. For metal hydride batteries, they may be recharged for 600 to 1000 times before they become unrechargeable and may be used less than 2 hours for each charge.

Sanyo has filed an application for a portable fuel cell power source and obtained U.S. Pat. No. 5,314,762 therefor. Although that patent does provide a design of structure different from conventional cells, it is still bulky in size and cannot be directly used in small size equipment such as portable computers and cameras.

SUMMARY OF THE INVENTION

A primary object of the present invention is to provide a hydrogen canister fuel cell battery which may be minimized for use in notebook computers, mobile phones, and the like.

Another object of the present invention is to provide a cell unit structure which may have a large-area contact with ambient air, so that the cell does not need air supply elements and starting power devices.

The above-mentioned objects are achieved by a hydrogen canister fuel cell battery essentially comprising a base, which has at least one hydrogen distribution channel communicating with a hydrogen canister for passage of hydrogen into fuel cells disposed on the base, and an air supply disposed in front of the fuel cells for sending air into the fuel cells, so that oxygen and hydrogen may react in the fuel cells to generate electricity by electrochemical reaction. The hydrogen canister fuel cell battery thus achieved is compact in size, so that it may be adapted for use in notebook computers and cellular telephones.

Preferably, the present invention also provides a structure in which an anode plate is connected to an anode current collector plate, and a membrane electrode assembly (MEA) is connected to the top of the anode plate. A porous material communicates with the MEA, and a negative current collector plate is connected to the porous material, such that the MEA has a larger area of contact with ambient air to obtain oxygen. Besides, there is no need to provide fans or starting power devices.

Preferably, the hydrogen canister is mounted on the base and is refillable or replaceable.

BRIEF DESCRIPTION OF THE DRAWINGS

The foregoing and other features and advantages of the present invention will be more clearly understood from the following detailed description and the accompanying drawings, in which.

FIGS. 9A–11B are similar to FIGS. 6–8, in which FIGS. 9A, 10A, and 11A are plan views, whereas FIGS. 9B, 10B and 11B are side views;

DETAILED DESCRIPTION OF THE PREFERRED EMBODIMENTS

Figure 1:
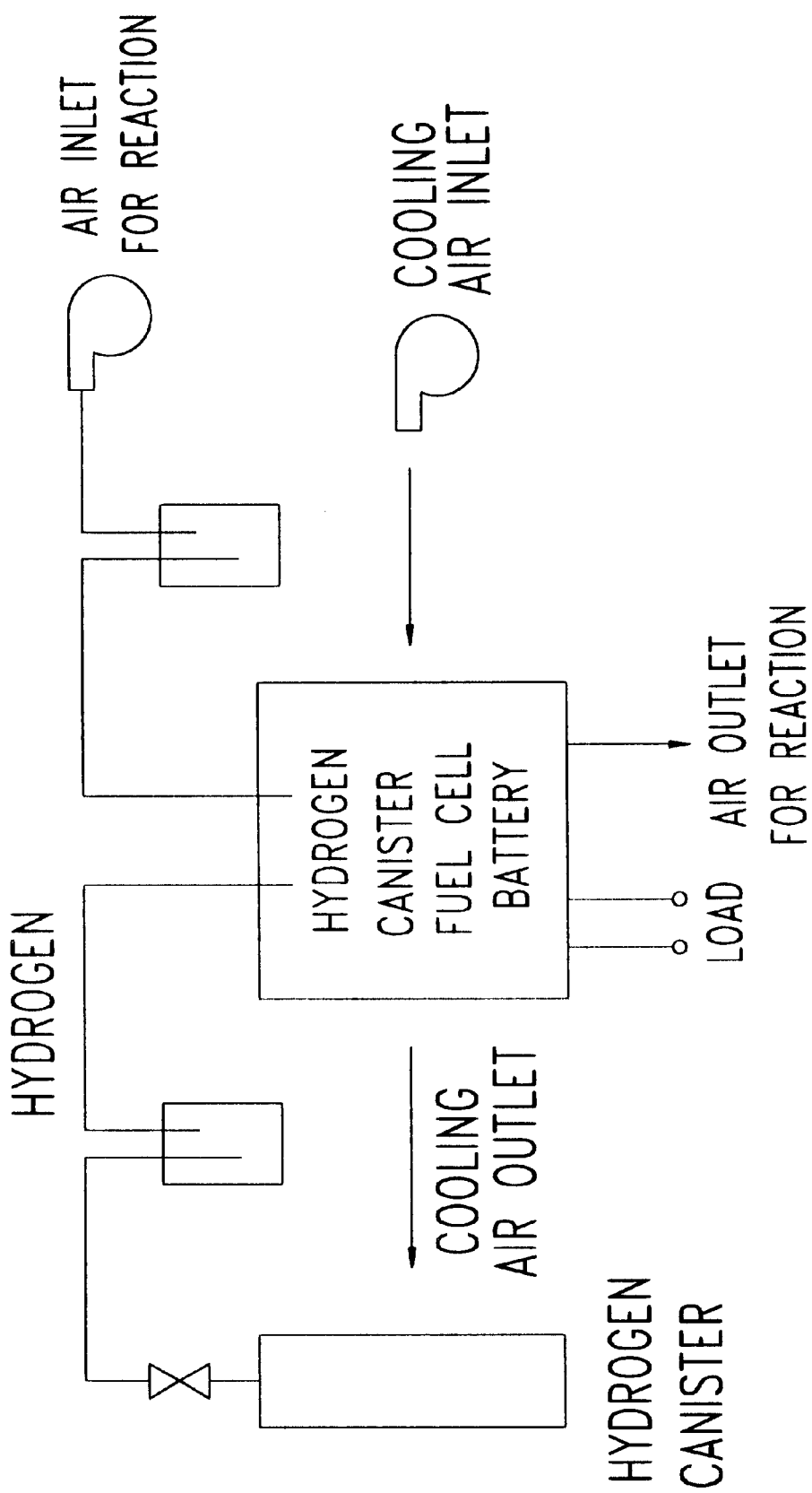
FIG. 1 is a schematic view of the framework of a first preferred embodiment of the present invention.

The technical structure of a first preferred embodiment of the hydrogen canister fuel cell battery according to the present invention is shown in FIG. 1. For the spatial arrangement of this embodiment, please refer to FIGS. 2A, 2B, 3, 4, 4A and FIG. 5. With reference to FIG. 1, the structure of the present invention essentially comprises a hydrogen canister for supplying hydrogen, and utilizes an air supply to send air to the fuel cells for generation of electricity by electrochemical reactions.

A hydrogen canister fuel cell battery 1 of the present invention comprises a base 2 having at least one hydrogen distribution channel 21 communicating with a hydrogen canister 3 for passage of hydrogen into a fuel cell 10 disposed on the base 2. An air supply such as a fan 51 is disposed in front of the fuel cell 10 for sending air into the fuel cells 10, where oxygen and hydrogen will generate electricity by electrochemical reaction. The hydrogen canister fuel cell battery of the present invention is minimized to be suited for equipment such as notebook computers and cellular phones.

Figure 4:
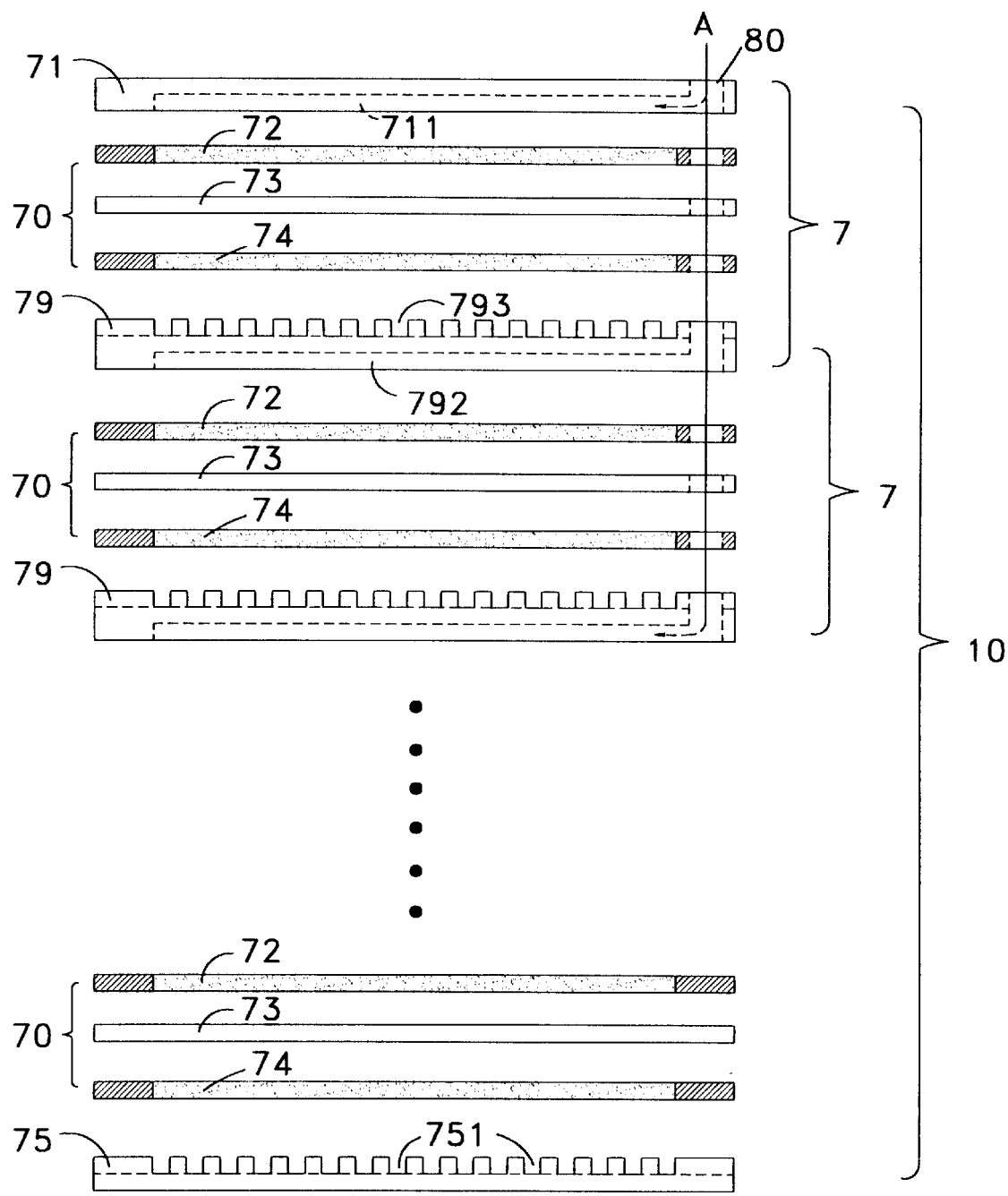
FIGS. 4 and 4A are exploded views of the fuel cell unit shown in FIG. 2A.
Figure 4A:
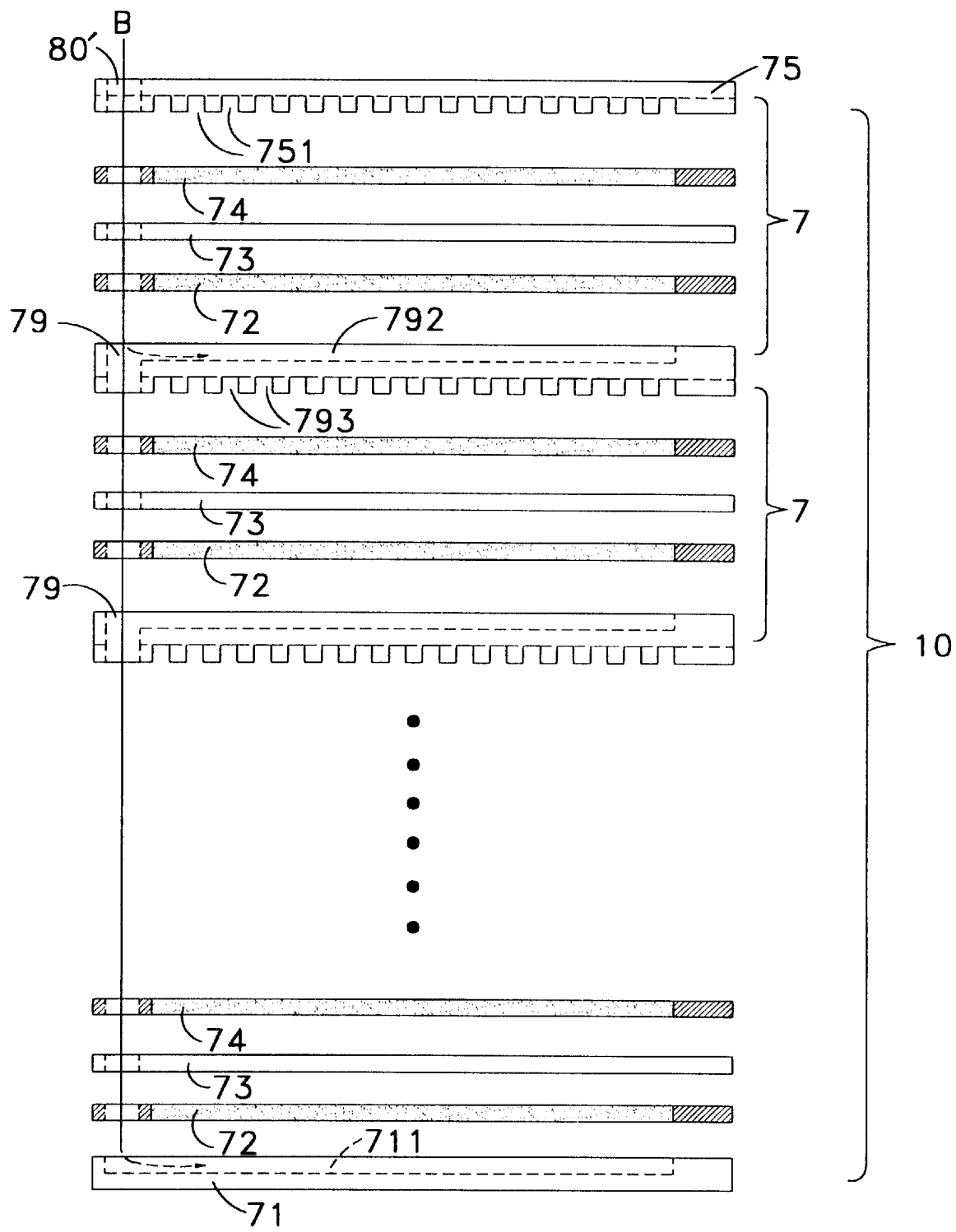

Reference is first made to FIG. 4 and then to FIG. 4A. In FIG. 4A, the components of the fuel cell 10 are arranged in reverse order to those illustrated in FIG. 4, showing that there are two arrangements of hydrogen and oxygen pathways. In path A, hydrogen passes from a pipe via hydrogen outlets 711, 792 into the MEA 70, while air passes from the air supply 51 (illustrated in FIG. 2A) into air paths 751, 793 and then into the MEA 70. In this way, hydrogen and oxygen in the air may react in the MEA 70 to generate electricity. In path B, hydrogen passes from a pipe via hydrogen outlets 711, 792 into the MEA 70, while air enters via air passages 751, 793 into the MEA 70, thereby hydrogen and oxygen in the air may react in the MEA 70 to generate electricity. It can therefore be seen that the components of the fuel cell 10 may be designed to have a two-sided arrangement. In this preferred embodiment, a planar, electrically conductive element including the hydrogen outlet 711 is an anode plate 71; a planar electrically conductive element including air passage 751 is a cathode plate 75; and a planar electrically conductive plate including both the hydrogen outlet 792 and the air passage 793 respectively on an upper side and a lower side thereof is a bipolar plate 79.

As shown in FIG. 4, the fuel cell 10 has a plurality of cell units 7. Each cell unit 7 essentially comprises an anode 72, an electrolyte layer 73, and a cathode 74 piled in sequence to constitute the MEA 70; the anode plate 71 is connected to the anode 72 and has the hydrogen outlet 711; and the bipolar plate 79 has the air passage 793 at its upper side and the hydrogen outlet 792 at its lower side. A plurality of cell units 7 may be stacked in this way, and the cathode 74 at the bottommost hydrogen-oxygen reaction layer 70 is connected to the cathode plate 75 having the air passage 751. A fuel cell 10 is thus accomplished. As a matter of fact, the present invention may be a fuel cell 10 having a single cell unit 7 according to electricity demand. The single cell unit 7 comprises an anode plate 71, a MEA 70, and a cathode plate 75 stacked in sequence, in which the hydrogen outlet 711 of the anode plate 71 and the hydrogen outlet 792 of the bipolar plate 79 are identically shaped, while the air passage 751 of the cathode plate 75 and the air passage 793 of the bipolar plate 79 are identically shaped.

Figure 2A:
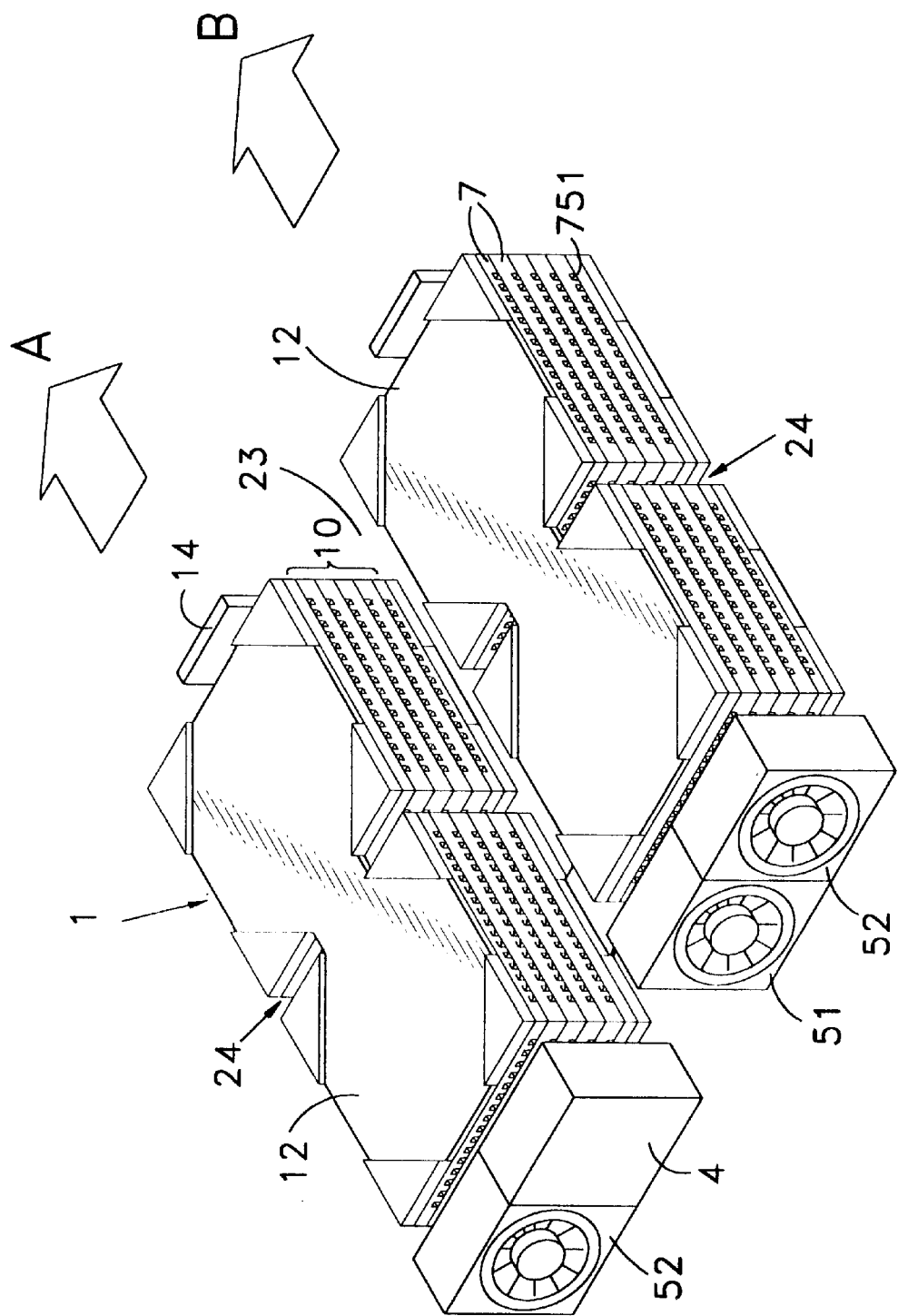
FIGS. 2A and 2B are perspective exploded views of the hydrogen canister fuel cell battery of the present invention, each showing a component part of the fuel cell.
Figure 2B:
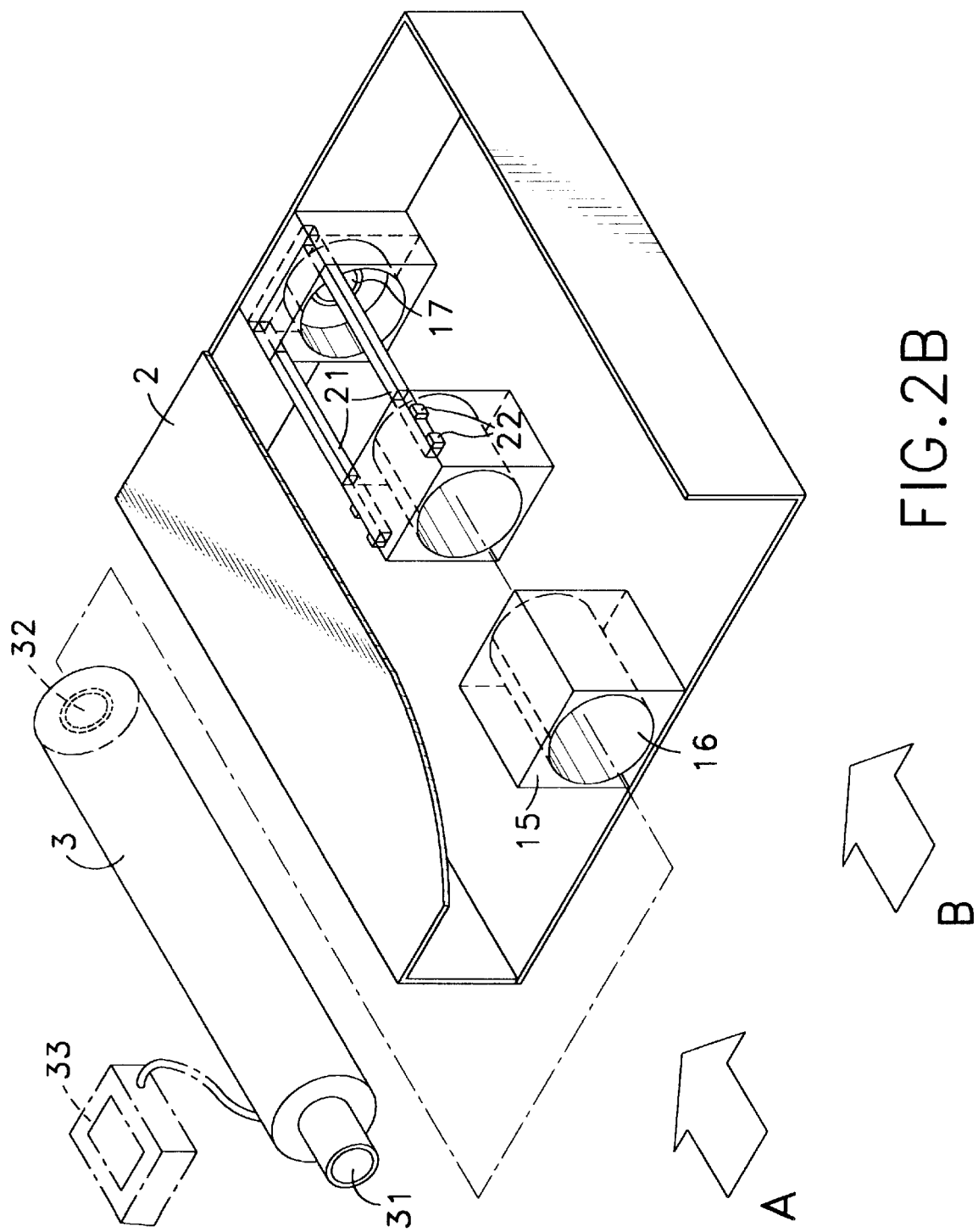

A hydrogen communicating channel 80 of the anode plate 71 is connected to a hydrogen inlet 22 shown in FIG. 2B, so that hydrogen from the hydrogen canister 3 enters via the hydrogen inlet 22 and the hydrogen communicating channel 80 into the anode 72 of the MEA 70 from the hydrogen outlets 711, 792. The air passages 751, 793 of the cathode plate 75 are multiple grooves, so that considerable air may pass through the cathode 74. In this way, when there is an external load, hydrogen and oxygen in the air may undergo electrochemical reactions in the MEA 70 to generate electricity.

Reference is made to FIG. 4A, which differs from FIG. 4 in the order of the components. Besides, the hydrogen communicating channel 80' is changed to the left side of the fuel cell. By means of this embodiment, when the fuel cells 10 are connected in series using the series plates 12 shown in FIG. 2A, since the same ends of different cells are opposite in polarity, the series plates may simply be planar in structure. Furthermore, the sum of the hydrogen reaction layer and the bipolar plate may be zero or a positive whole number.

Figure 3:
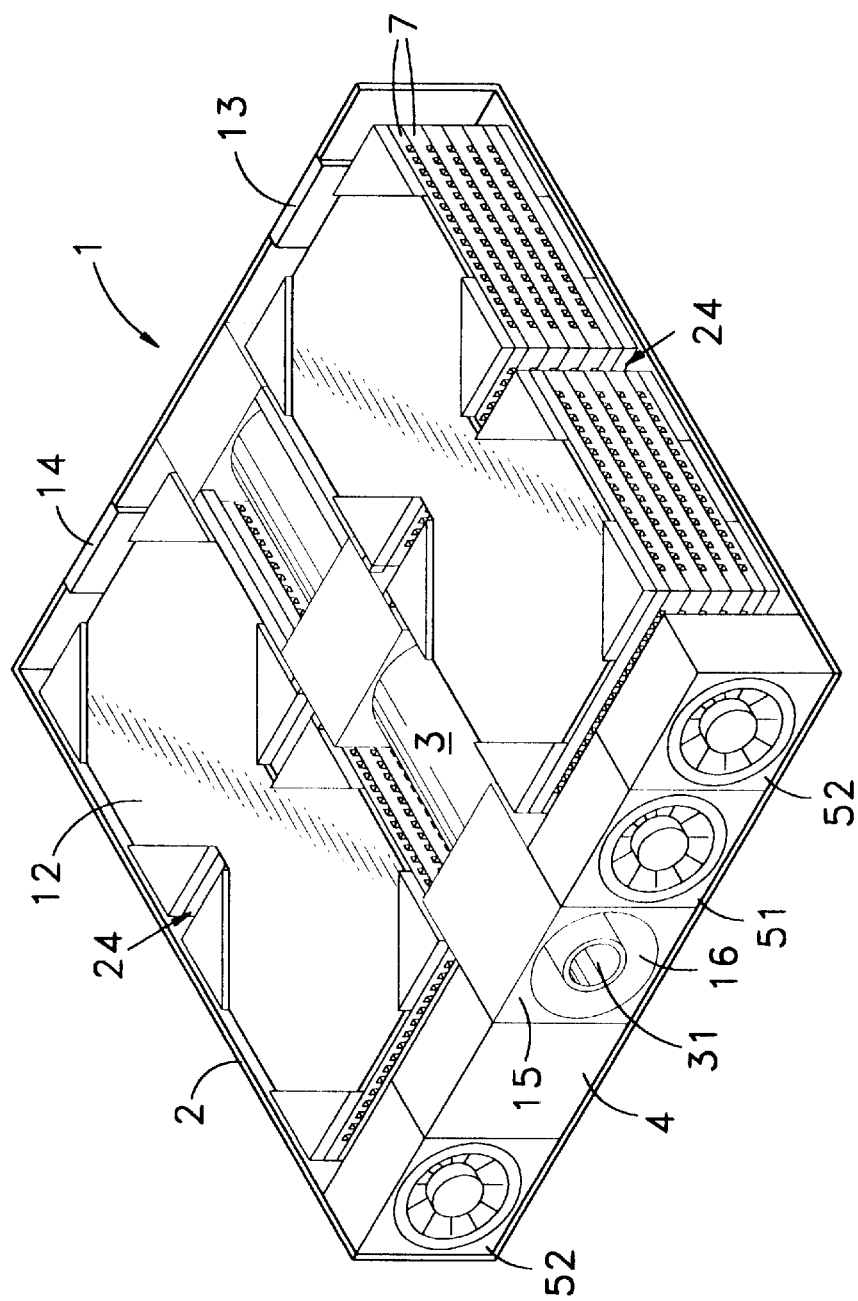
FIG. 3 is a perspective assembled view of the hydrogen canister fuel cell battery shown in FIGS. 2A and 2B.

As shown in FIGS. 2A, 2B, and 3, the base 2 for mounting the fuel cells 10 has at least one hydrogen distribution channel 21 and at least one hydrogen inlet 22 at one end of the hydrogen distribution channel 21 for distributing hydrogen evenly to the fuel cells 10. An air supply 51 such as a fan located at a front end of the fuel cells 10 is provided for sending air into the fuel cells 10. The hydrogen canister 3 is provided for supplying hydrogen via the hydrogen distribution channel 21 of the base 2 to the fuel cells 10 so that the hydrogen may undergo electrochemical reactions with oxygen in the air.

The fuel cells 10 on the base 2 are arranged such that a cross-shaped passage is formed. The cross-shaped passage includes a longitudinal passage 23 and a transverse passage 24. A rear end of the longitudinal passage 23 is provided with a retaining seat 15 thereon. The retaining seat 15 has one end provided with a hydrogen connector 17 communicating with the hydrogen distribution channel 21. The hydrogen connector 17 may be a quick-connector for coupling to the hydrogen canister 3. The retaining seat 15 has an insert groove 16 thereon for receiving the hydrogen canister 3 to be coupled to the hydrogen connector 17. The insert groove 16 and the hydrogen canister 3 are preferably identically shaped. For instance, if the hydrogen canister 3 is cylindrical, the insert groove 16 should be circular. The interior of the hydrogen canister 3 has a metal alloy such as lanthanum nickel alloy or titanium iron alloy for adsorbing or desorbing oxygen. At the same time, the hydrogen canister 3 has a filler hole 31 for refill of hydrogen. An outlet 32 of the hydrogen canister 3 is tightly connected to the hydrogen connector 17 of the retaining seat 15.

The above-mentioned fuel cell 10 is a hydrogen/air reactive type. And as shown in FIG. 2B, the hydrogen canister fuel cell battery may further comprise a sensor element 33 for detecting the amount of hydrogen inside the hydrogen canister 3 and converting it into an electric current so that the user may know the hydrogen consumed and left. Furthermore, as shown in FIGS. 2A and 3, the hydrogen canister fuel cell battery may further comprise a starting power device such as a few batteries for providing the fan 51 until the fuel cell battery of the present invention functions. Then power will be supplied by the fuel cell battery itself without consuming the energy of the starting power device.

An embodiment of the hydrogen canister fuel cell battery of the present invention in which the starting power device and the fan are not required will be described hereinafter. But embodiments of various arrangements of the hydrogen canister 3 and the fuel cells 10 will firstly be described with reference to the drawings.

Figure 8:
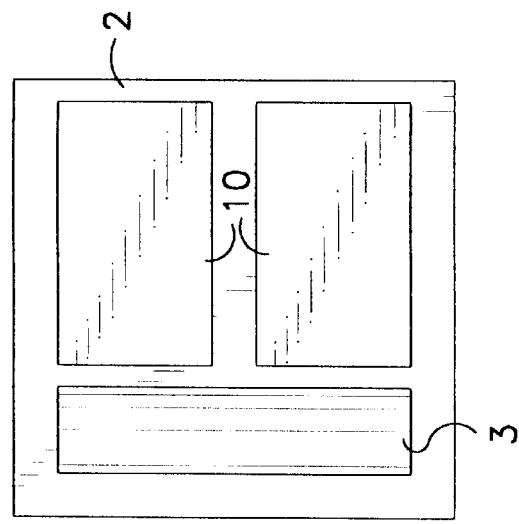
FIGS. 6–8 are plan views of the arrangement of the fuel cells and hydrogen canister of the invention.
Figure 7:
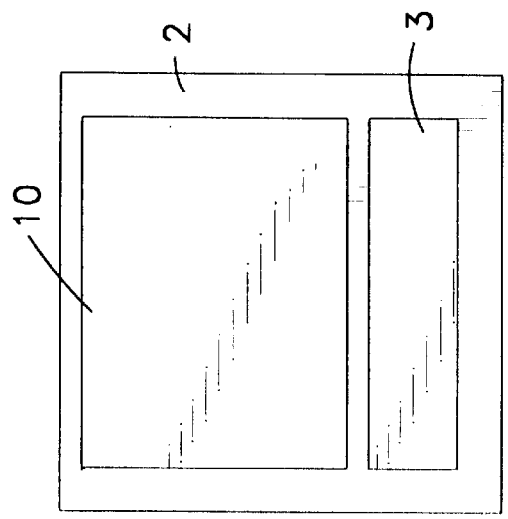
Figure 6:
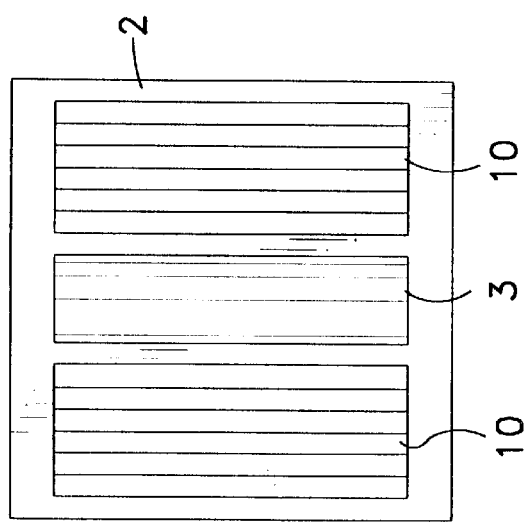

FIGS. 6–8 are schematic diagrams showing the arrangements of these components. As shown in FIGS. 3 and 6, the hydrogen canister 3 is disposed at the center of the base 2, while the fuel cells 10 are located at both sides. As shown in FIG. 7, the fuel cells 10 are disposed at the rear half portion of the base 2, while the hydrogen canister 3 is provided at the front to facilitate operation and replacement. In FIG. 8, the hydrogen canister 3 and the fuel cells 10 are respectively disposed at both sides of the base 2, with the two fuel cells juxtaposed so that they may be connected in series.

FIGS. 9A–11B further show that each fuel cell unit 7 is transversely or longitudinally stacked. In FIGS. 9A and 9B, the fuel cells 10 are transversely stacked, while those in FIGS. 10A and 10B are longitudinally stacked in rows. Although the fuel cells 10 in FIGS. 11A and 11b are shown to be transversely stacked, the hydrogen canister 3 is mounted below the fuel cells 10. However the arrangements are, the fuel cells 10 may be connected in series by series plates 12 as the embodiment shown in FIG. 3 to form a negative end 13 and a positive end 14.

Figure 12:
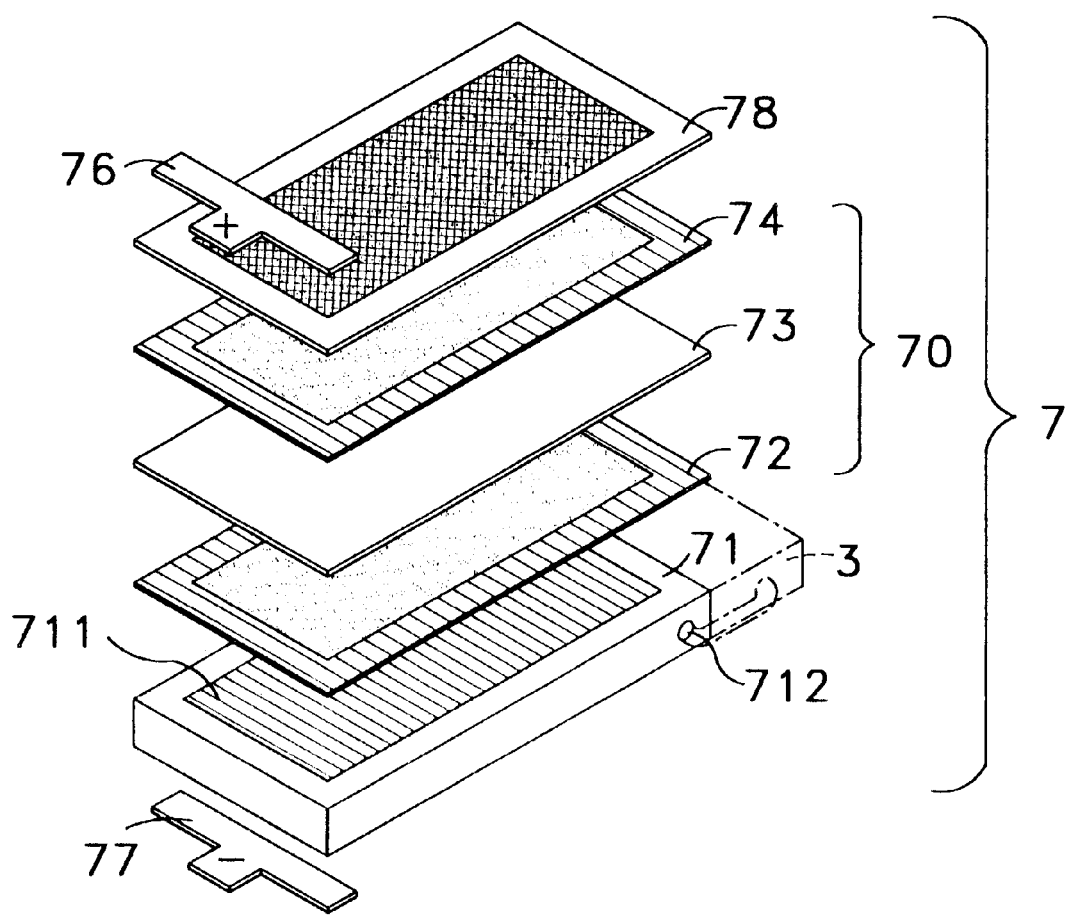
FIGS. 12 and 13 are respectively perspective exploded views of the hydrogen canister fuel cell battery of the present invention.
Figure 13:
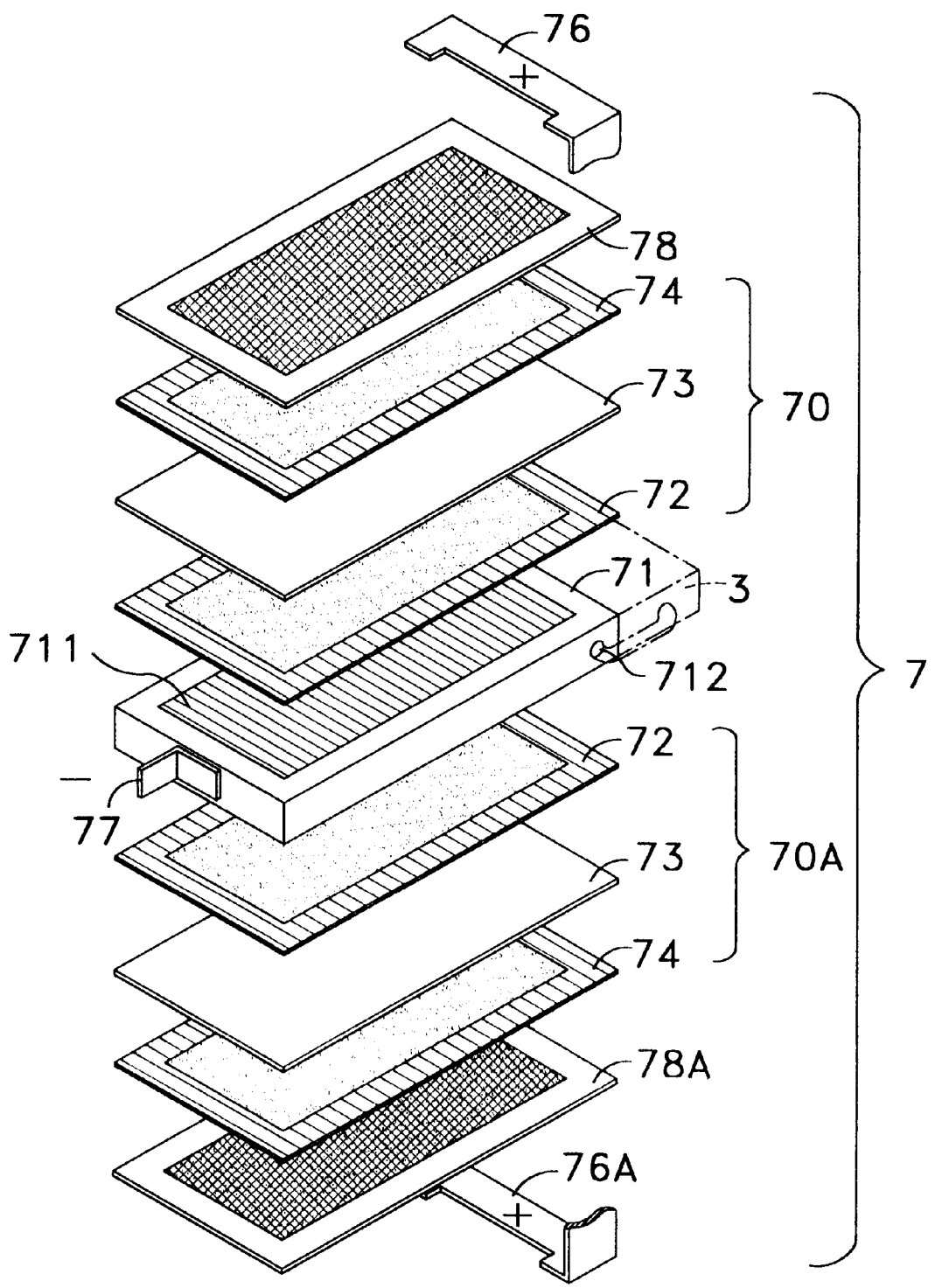

As mentioned above, the present invention also provides a fuel cell battery that does not require a starting power device or a fan. As shown in FIG. 12, the fuel cell battery comprises in sequence of stacking an anode plate 71 having a plate body, a top, a bottom, multiple hydrogen outlets 711 distributed at the top of the plate body, and hydrogen inlets 712 communicating with the hydrogen outlets 711; an anode current collector plate 77 connecting the anode plate 71; a first MEA 70 communicating with the top of the anode plate 71 for entry of hydrogen; a first porous material 78 communicating with the MEA 70 for passage of air to the MEA 70; and a first negative current collector plate 76 connected to the porous material 78. The above-mentioned fuel cell battery further comprises a hydrogen canister 3 for supplying hydrogen through the anode plate 71 to react electrochemically with oxygen in the air in the MEA 70 so as to generate electricity. A similar embodiment is illustrated in FIG. 13. The fuel cell battery may further comprise a second MEA 70A communicating with the bottom of the anode plate 71, the bottom having multiple hydrogen outlets for entry of hydrogen; a second porous material 78A communicating with the second MEA 70A for passage of air to the second MEA 70A; and a second negative current collector plate 76A connecting the porous material 78A. In this embodiment, the first and second negative current collecting plates 76, 76A are connected to form a negative end. There is an anode current collector plate 77 connected to the above-mentioned anode plate 71.

The number of the fuel cells and fuel cell units may be adjusted according to the desired voltage output. The active area of the cell may be adjusted according to the rated electric current output. During start-up, the hydrogen canister 3 is slightly pushed into the insert groove 16 of the retaining seat 15 to the end. Then, the hydrogen outlet 32 at the bottom of the hydrogen canister 3 will quickly couple to and communicate with the hydrogen connector 17, so that hydrogen may flow via the hydrogen distribution channel 21 and hydrogen inlet 22 into the fuel cell battery. The starting power device 4 will also start instantaneously at start-up, so that the fan 51 rotates to force air into the air channel 11 of the fuel cell. At this point, the induced air will react electrochemically with hydrogen in the fuel cell to generate electricity. Most of the electricity is for external use. Only a small portion of the electricity is used to drive the fan 51 previously driven by the starting power device. Aside from reacting with the hydrogen, the induced air is used in part to remove heat during the electrochemical reaction. The function of the cooling fan 52 is to selectively supply air so as to control the temperature of the fuel cell. Furthermore, when the hydrogen storing material releases hydrogen, heat will be absorbed in reaction. When cool air enters the fuel cell battery, the fuel cell may be cooled, and when hot air passes through the hydrogen canister, the temperature of the air will be lowered. Therefore, the temperature of unreacted air discharged from the fuel cell battery may be maintained at a suitable level. And during the process of electricity discharge, water moisture generated by the negative pole may be exhausted with the unreacted air.

Figure 5:
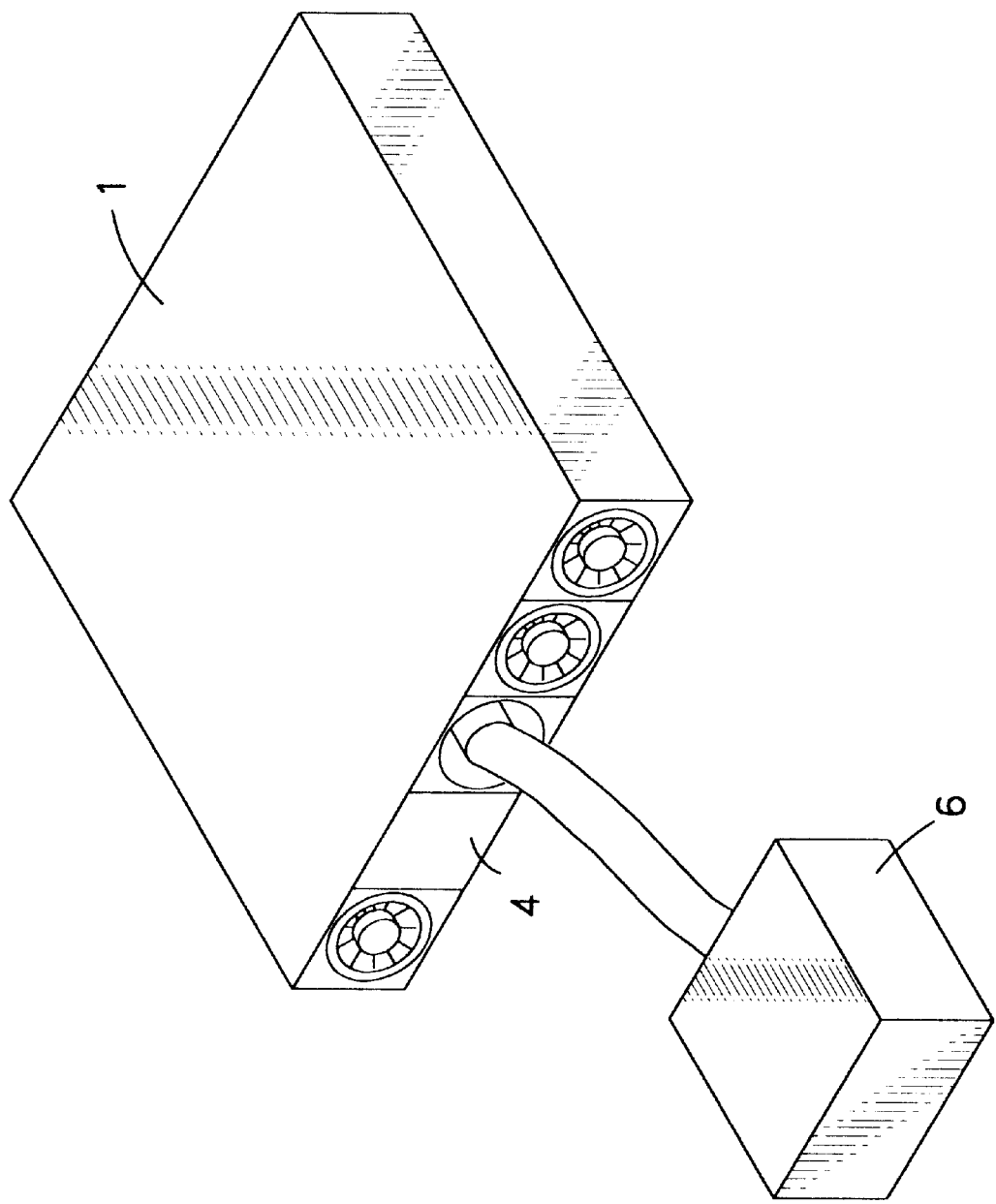
FIG. 5 is a schematic view of the battery in FIG. 3 being connected with a hydrogen storage canister.

When all the hydrogen in the hydrogen storing material has been released, the detachable hydrogen canister 3 may be taken down and replaced with a full hydrogen canister. Alternatively, as shown in FIG. 5, a hydrogen source 6 may be poured into the filler hole 31 of the empty hydrogen canister 3. Since it takes a very short time for the hydrogen storing material to absorb the hydrogen, both of these two alternatives are practical. During replacement, the hydrogen canister 3 is pulled out with a little force on a handle thereof. Then the hydrogen canister 3 will be disengaged from the retaining seat 15, and the hydrogen outlet 32 at the end of the hydrogen canister 3 will speedily disengage from the hydrogen connector 17 of the retaining seat 15 and will automatically close to prevent entry of air.

The hydrogen canister fuel cell battery of the invention may, as shown in FIG. 1, have various shapes, e.g., the hydrogen canister and the fuel cell may be independent components or combined as a whole. Besides, their relative arrangement may have various changes. The hydrogen canister fuel cell battery of the invention may be inserted into equipment requiring direct currents, such as notebook computers. Or it may be an independent power supply.

Although the present invention has been illustrated and described with reference to the preferred embodiments thereof, it should be understood that it is in no way limited to the details of such embodiments, but is capable of numerous modifications within the scope of the appended claims.

What is claimed is:

1. A hydrogen canister fuel cell battery, comprising:
   a fuel cell device having at least two fuel cell stacks each having a single or a plurality of fuel cell units arranged in a juxtaposed relationship;
   a base for mounting said fuel cells, said base having at least a hydrogen distribution channel, and a hydrogen inlet at one end of said hydrogen distribution channel for uniformly distributing and supplying hydrogen to said fuel cells;
   an air supply, provided on said base for sending air into said fuel cells; and
   a hydrogen canister, for supplying hydrogen to said fuel cells to react electrochemically with oxygen in the air;
   wherein said hydrogen canister fuel cell battery further comprises a sensor element, for detecting the amount of hydrogen in said hydrogen canister for conversion into electric currents.

2. The hydrogen canister fuel cell battery as claimed in claim 1
   wherein said hydrogen canister is disposed between said fuel cells.

3. The hydrogen canister fuel cell battery as claimed in claim 1,
   wherein said hydrogen canister and said fuel cell device are respectively disposed at both sides of said base.

4. The hydrogen canister fuel cell battery as claimed in claim 1,
   wherein said hydrogen canister is provided in front of said fuel cells.

5. The hydrogen canister fuel cell battery as claimed in claim 1,
   wherein said hydrogen canister is provided above said fuel cell device, and said fuel cells are longitudinally stacked.

6. The hydrogen canister fuel cell battery as claimed in claim 1,
   wherein said fuel cells define a cross-shaped passage on said base, said cross-shaped passage including a longitudinal passage and a transverse passage.

7. The hydrogen canister fuel cell battery as claimed in claim 1,
   wherein said fuel cell device has a plurality of fuel cell stacks which are connected in series by series plates to form positive and negative ends for power output.

8. The hydrogen canister fuel cell battery as claimed in claim 1,
   wherein said fuel cell comprises, in sequence of stacking,
   an anode plate having hydrogen outlets,
   a plurality of membrane electrode assemblies and bipolar plates having a plurality of hydrogen outlets and air passages, an auxiliary membrane electrode assembly, and
   a cathode plate having a plurality of air passages, whereby hydrogen passes through said anode plate and hydrogen outlets of said bipolar plates to said membrane electrode assemblies, and air passes through said cathode plate and air passages of said bipolar plates to said auxiliary membrane electrode assembly for electrochemical reactions.

9. The hydrogen canister fuel cell battery as claimed in claim 1,
   wherein said hydrogen canister fuel cell battery further comprises a starting power device for providing said fan with power.

10. The hydrogen canister fuel cell battery as claimed in claim 1,
    wherein said hydrogen canister is provided above said fuel cell device, and said fuel cells are transversely stacked.

11. The hydrogen canister fuel cell battery as claimed in claim 1, wherein said hydrogen canister and said fuel cell device are detachable connected.

12. The hydrogen canister fuel cell battery as claimed in claim 6,
wherein said longitudinal passage is provided with a retaining seat at a rear end thereof, one end of said retaining seat having a hydrogen connector for communicating with said hydrogen distribution channel so that said retaining seat may be coupled to said hydrogen canister.

13. The hydrogen canister fuel cell battery as claimed in claim 12,
wherein said hydrogen connector is a quick connector.

14. The hydrogen canister fuel cell battery as claimed in claim 12,
wherein said retaining seat has an insert groove thereon for receiving said hydrogen canister which may be coupled to said hydrogen connector.

15. The hydrogen canister fuel cell battery as claimed in claim 1,
wherein said hydrogen canister has a filler hole for refill of hydrogen.

16. A hydrogen canister fuel cell battery comprising:
a fuel cell device having at least two fuel cell stacks each having a single or a plurality of fuel cells units arranged in a juxtaposed relationship;
a base for mounting said fuel cells, said base having at least a hydrogen distribution channel, and a hydrogen inlet at one end of said hydrogen distribution channel for uniformly distributing and supplying hydrogen to said fuel cells;
an air supply, provided on said base for sending air into said fuel cells; and
a hydrogen canister, for supplying hydrogen to said fuel cells to react electrochemically with oxygen in the air;
wherein said hydrogen canister is disposed between said fuel cells.

17. The hydrogen canister fuel cell battery as claimed in claim 16, wherein
said hydrogen canister fuel cell battery further comprises a sensor element, for detecting the amount of hydrogen in said hydrogen canister for conversion into electric currents.

18. The hydrogen canister fuel cell battery as claimed in claim 16, wherein
said hydrogen canister and said fuel cell device are respectively disposed at both sides of the base.

19. The hydrogen canister fuel cell battery as claimed in claim 16, wherein
said hydrogen canister is provided in front of said fuel cells.

20. The hydrogen canister fuel cell battery as claimed in claim 16,
wherein said hydrogen canister is provided above said fuel cell device, and said fuel cells are longitudinally stacked.

21. The hydrogen canister fuel cell battery as claimed in claim 16,
wherein said fuel cells define a cross-shaped passage on said base, said cross-shaped passage including a longitudinal passage and a transverse passage.

22. The hydrogen canister fuel cell battery as claimed in claim 16,
wherein said fuel cell device has a plurality of fuel cell stacks which are connected in series by series plates to form positive and negative ends for power output.

23. The hydrogen canister fuel cell battery as claimed in claim 16,
wherein said fuel cell comprises, in sequence of stacking,
an anode plate having hydrogen outlets,
a plurality of membrane electrode assemblies and bipolar plates having a plurality of hydrogen outlets and air passages, an auxiliary membrane electrode assembly, and a cathode plate having a plurality of air passages,
whereby hydrogen passes through said anode plate and hydrogen outlets of said bipolar plates to said membrane electrode assemblies, and air passes through said cathode plate and air passages of said bipolar plates to said auxiliary membrane electrode assembly for electrochemical reactions.

24. The hydrogen canister fuel cell battery as claimed in claim 16,
wherein said hydrogen canister fuel cell battery further comprises a starting power device for providing said fan with power.

25. The hydrogen canister fuel cell battery as claimed in claim 16,
wherein said hydrogen canister is provided above said fuel cell device, and said fuel cells are transversely stacked.

26. The hydrogen canister fuel cell battery as claimed in claim 16,
wherein said hydrogen canister and said fuel cell device are detachably connected.

27. The hydrogen canister fuel cell battery as claimed in claim 21,
wherein said longitudinal passage is provided with a retaining seat at a rear end thereof, one end of said retaining seat having a hydrogen connector for communicating with said hydrogen distribution channel so that said retaining seat may be coupled to said hydrogen canister.

28. The hydrogen canister fuel cell battery as claimed in claim 27,
wherein said hydrogen connector is a quick connector.

29. The hydrogen canister fuel cell battery as claimed in claim 27, wherein said retaining seat has an insert groove thereon for receiving said hydrogen canister which may be coupled to said hydrogen connector.

30. The hydrogen canister fuel cell battery as claimed in claim 16,
wherein said hydrogen canister defines a filler hole for refill of hydrogen.

31. A hydrogen canister fuel cell battery comprising:
an anode plate, having a plate body, a top, a bottom, a plurality of hydrogen outlets distributed on said top, and
a hydrogen inlet for communicating with said hydrogen outlets;
an anode current collector plate for connection with said anode plate;
a first membrane electrode assembly, being disposed next to said top of said anode plate for entrance of hydrogen into said anode;
a first porous material, being adjacent to said membrane electrode assembly for passage of air through said material to said cathode;
a first cathode current collector plate, for connection with said porous material; and
a hydrogen canister, for supplying hydrogen through said anode plate to react electrochemically with oxygen in the air within said membrane electrode assembly for generation of electricity;

wherein said hydrogen canister fuel cell battery further comprises a sensor element for detecting an amount of hydrogen in said hydrogen canister for conversion into electric currents.

* * * * *